(12) United States Patent
Zhu (10) Patent No.: US 10,956,552 B2
(45) Date of Patent: Mar. 23, 2021

(54) SHOULDER-SURFING RESISTANT AUTHENTICATION METHODS AND SYSTEMS

(71) Applicant: Ye Zhu, Westlake, OH (US)

(72) Inventor: Ye Zhu, Westlake, OH (US)

(73) Assignee: Cleveland State University, Cleveland, OH (US)

( * ) Notice: Subject to any disclaimer, the term of this patent is extended or adjusted under 35 U.S.C. 154(b) by 221 days.

(21) Appl. No.: 15/943,847

(22) Filed: Apr. 3, 2018

(65) Prior Publication Data

US 2018/0285550 A1 Oct. 4, 2018

Related U.S. Application Data

(60) Provisional application No. 62/480,762, filed on Apr. 3, 2017.

(51) Int. Cl.
*G06F 21/36* (2013.01)
*G06F 3/0484* (2013.01)
*G06F 3/0481* (2013.01)

(52) U.S. Cl.
CPC .......... *G06F 21/36* (2013.01); *G06F 3/04817* (2013.01); *G06F 3/04845* (2013.01)

(58) Field of Classification Search
CPC ... G06F 21/36; G06F 3/04817; G06F 3/04845
USPC .......................................................... 726/1
See application file for complete search history.

(56) References Cited

U.S. PATENT DOCUMENTS

| | | | | |
|---|---|---|---|---|
| 8,196,198 | B1* | 6/2012 | Eger | G06F 21/36 726/21 |
| 9,563,723 | B1* | 2/2017 | Breed | G06F 17/5009 |
| 2003/0005299 | A1* | 1/2003 | Xia | G06F 21/31 713/171 |
| 2004/0073813 | A1* | 4/2004 | Pinkas | H04L 9/3226 726/5 |
| 2005/0283075 | A1* | 12/2005 | Ma | G01S 15/8979 600/441 |
| 2006/0248344 | A1* | 11/2006 | Yang | G07C 9/33 713/183 |
| 2007/0277224 | A1* | 11/2007 | Osborn | G06F 21/36 726/2 |
| 2008/0077597 | A1* | 3/2008 | Butler | G06F 16/9537 |
| 2008/0077883 | A1* | 3/2008 | Kim | H04M 1/2746 715/835 |
| 2009/0276151 | A1* | 11/2009 | Bucchieri | G01C 21/3644 701/423 |

(Continued)

*Primary Examiner* — Aravind K Moorthy
(74) *Attorney, Agent, or Firm* — Renner Kenner LPA (57) ABSTRACT

A shoulder-surfing resistant authentication method and system includes a computing device, such as a smart phone, which includes a display for presenting an interactive virtual environment. During the authentication process, the user enters a passcode by modifying one or more attributes of one or more icons that are presented relative to the interactive environment. Such attributes may include one or more of the type of movement the icons perform, the change in position or visual characteristics of the icons relative to the virtual environment, as well as the removal and/or addition of one or more icons relative to the virtual environment. The entered passcode is then compared with a previously stored or "set" passcode to authenticate the user before granting access to the computing device.

19 Claims, 3 Drawing Sheets

(56) References Cited

U.S. PATENT DOCUMENTS

| | | | | |
|---|---|---|---|---|
| 2010/0011419 A1* | 1/2010 | Seo | G06F 21/36 | 726/5 |
| 2010/0251388 A1* | 9/2010 | Dorfman | G06F 21/36 | 726/29 |
| 2011/0185311 A1* | 7/2011 | King | G06F 21/36 | 715/794 |
| 2011/0288914 A1* | 11/2011 | Guthrie | G06Q 30/02 | 705/14.4 |
| 2012/0113140 A1* | 5/2012 | Hilliges | G06F 3/011 | 345/633 |
| 2013/0167225 A1* | 6/2013 | Sanft | G06F 3/04842 | 726/19 |
| 2013/0347087 A1* | 12/2013 | Smith | G06F 21/36 | 726/7 |
| 2013/0347090 A1* | 12/2013 | Foote | G06F 21/36 | 726/7 |
| 2014/0115488 A1* | 4/2014 | Hackborn | H04M 1/72544 | 715/741 |
| 2014/0201832 A1* | 7/2014 | Yi | G06F 3/0486 | 726/19 |
| 2014/0325678 A1* | 10/2014 | Kotla | G06F 21/84 | 726/28 |
| 2015/0121493 A1* | 4/2015 | Chen | G06F 21/36 | 726/6 |
| 2015/0135291 A1* | 5/2015 | Yang | G06F 21/31 | 726/6 |
| 2015/0150120 A1* | 5/2015 | Liu | G06F 3/04817 | 726/19 |
| 2015/0169178 A1* | 6/2015 | Wang | G06F 3/04883 | 715/765 |
| 2015/0205498 A1* | 7/2015 | Levi | G06F 3/04842 | 715/763 |
| 2016/0019720 A1* | 1/2016 | Thurber | H04N 13/344 | 345/419 |
| 2016/0062629 A1* | 3/2016 | Takiguchi | G06F 3/04883 | 715/763 |
| 2016/0065713 A1* | 3/2016 | Yang | G06F 3/0488 | 455/411 |
| 2016/0217616 A1* | 7/2016 | Kraver | G06F 3/012 | |
| 2016/0284136 A1* | 9/2016 | Johnston | G06T 19/006 | |
| 2016/0286208 A1* | 9/2016 | Drouin | H04N 21/4307 | |
| 2016/0350848 A1* | 12/2016 | Acharya | G06Q 40/02 | |
| 2017/0115835 A1* | 4/2017 | Nishiyama | G06F 3/04817 | |
| 2017/0123603 A1* | 5/2017 | Chang | G06F 3/0488 | |
| 2017/0139556 A1* | 5/2017 | Josephson | H04L 67/12 | |
| 2017/0148091 A1* | 5/2017 | Lin-Hendel | G06Q 30/0643 | |
| 2017/0270898 A1* | 9/2017 | Kim | G06F 3/048 | |
| 2018/0021579 A1* | 1/2018 | Kahana | A61N 1/36135 | 607/45 |
| 2018/0024728 A1* | 1/2018 | Cheng | H04W 88/02 | 715/863 |
| 2018/0137268 A1* | 5/2018 | Sawant | G06F 21/316 | |
| 2018/0137661 A1* | 5/2018 | Fang | G06T 7/194 | |
| 2018/0189254 A1* | 7/2018 | Sutton | G06F 3/0485 | |
| 2019/0342444 A1* | 11/2019 | Urrutia Daglio | G06F 3/04817 | |

* cited by examiner

SHOULDER-SURFING RESISTANT AUTHENTICATION METHODS AND SYSTEMS

CROSS-REFERENCE TO RELATED APPLICATION

This application claims the benefit of U.S. Provisional Application No. 62/480,762 filed Apr. 3, 2017, the contents of which are incorporated herein by reference.

STATEMENT REGARDING FEDERALLY SPONSORED RESEARCH OR DEVELOPMENT

This invention was made with government support under Contract No. 1343141 awarded by the National Science Foundation (NSF). The government has certain rights in the invention.

TECHNICAL FIELD

Generally, the embodiments disclosed herein relate to authentication methods and systems. Particularly, the embodiments disclosed herein relate to shoulder-surfing resistant authentication methods and systems. More particularly, the embodiments disclosed herein relate to methods and systems in which a user authenticates themselves by controlling one or more icons in a virtual environment to satisfy predetermined rules of a "set" passcode.

BACKGROUND

Mobile devices, such as smartphones, tablets and mobile computers, are becoming increasingly popular due to a multitude of useful and entertaining applications, and their ability to leverage the nearly ubiquitous Internet access that is provided by various wireless communication networks, such as WIFI, 3G, 4G, and LTE. However, to protect against unauthorized access to these mobile devices, including the private data and applications stored therein, a user is typically required to enter an alphanumeric password into a graphical interface on the mobile device. However, due to the nature of the interaction of the user with the interface of the mobile device, the user is susceptible to shoulder-surfing attacks in which an unauthorized individual strategically positions their field of view, often over the shoulder of the user, to view the screen of the mobile device as the password is being entered. For example, a user on a crowded subway train desiring to check their email using his or her smartphone, unlocks their smartphone by entering their password on its screen. As the unlocking process is carried out, a shoulder-surfing attack is simultaneously performed by the unauthorized individual who is looking at the screen of the smartphone from behind, and over the shoulder of the smartphone user. Furthermore, it has been demonstrated that smartphone users unlock their devices an average of 48 times per day (about 3 unlocks per hour), and that shoulder-surfing is possible in about 17% of these cases. Thus, because current authentication schemes and methods utilized on mobile devices are not resistant to shoulder-surfing attacks, users of such mobile devices are at risk of having their password stolen, and subsequently used to gain unauthorized access to the mobile device, and the data and/or applications stored thereon.

In order to combat shoulder-surfing attacks, many efforts have been pursued to make mobile devices and applications executed thereon resistant to such attacks. For example, one shoulder-surfing resistant authentication technique that has been studied relates to enhancing the traditional multi-digit personal identification number (PIN) that is used as an authentication password. This technique requires an entry pad that is used to enter the PIN to be separated into two distinct portions, such that one portion of the PIN entry pad appears as "black" buttons, while another portion of the PIN entry pad appears as "white" buttons. Then, for each PIN digit, the user is asked to confirm which of the two portions of the entry pad was used to enter the particular PIN digit, until each digit is confirmed. Thus, by associating each PIN digit with a color, the risk of shoulder-surfing attacks is reduced. Similar shoulder-surfing resistant schemes, such as that provided under the trademarks SwiPIN, ColorPIN, and The Phone Lock, have also been developed. However, all of these authentication techniques suffer from weak security strength inherent in the PIN itself, making it susceptible to being easily compromised by brute-force attacks, which is undesirable.

Additional efforts to prevent shoulder-surfing attacks include a "Draw a Secret" authentication technique, which involves erasing the strokes of an authentication gesture as they are drawn. Such technique has been found to reduce the rate in which medium-strength passwords are captured by an unauthorized individual, or attacker, after a single observation from 80% to about 40%. Further modifications of the "Draw a Secret" authentication technique have also been pursued, whereby a grid is added, so that in addition to matching the "Draw a Secret" gesture, users must also match the direction (e.g. up, down, left, right) in which the strokes of their gesture pass through the added grid lines.

Yet another shoulder-surfing resistant authentication technique, referred to as convex-hull-click (CHC), has also been studied. CHC utilizes a graphical password scheme in which users choose graphical icons to represent their password. Rather than clicking the icons, users are required to click inside a triangular area bounded by the icons that form their password. However, CHC suffers from long authentication times because multiple click sessions are required, and due to the added time needed for users to find the icons representing their password.

Other shoulder-surfing resistant schemes have also been developed, such as CDS. CDS is a combination of the "Draw a Secret" and "Story" authentication techniques, whereby a series of images are randomly arranged into a grid to allow users to draw a line through the images they have previously chosen to represent their passwords.

While these authentication techniques provide various levels of resistance to shoulder-surfing attacks, they still have limited effectiveness, especially when applied to mobile devices. This is because such techniques demand large displays and high-performance hardware to execute their authentication scheme, which are characteristics not typically embodied in mobile devices.

Therefore, there is a need for an effective shoulder-surfing resistant authentication method that may be utilized on any device, such as mobile devices for example.

SUMMARY

In light of the foregoing, it is a first aspect of the various embodiments disclosed herein to provide an authentication method comprising displaying a virtual environment; providing one or more icons arranged relative to the virtual environment; updating at least one attribute of the one or more icons relative to the virtual environment to form an entered passcode; and determining whether the entered passcode is authenticated based on a comparison with a previously set rule.

It is a further aspect of the various embodiments disclosed herein to provide a computing device restricting access to authenticated users comprising means for displaying a virtual environment and at least one icon in the virtual environment; means for changing at least one attribute of the at least one icon relative to the virtual environment to form an entered passcode; and means for authenticating the entered passcode to control access to data stored in the computing device.

It is still another aspect of the various embodiments disclosed herein to provide an authentication method that includes presenting a virtual environment; providing one or more icons randomly arranged relative to the virtual environment; performing at least one movement, modification or removal of at least one of the one or more provided icons, or addition of at least one new icon to the virtual environment to form an entered passcode; and determining whether the entered passcode is authenticated based on a comparison with one or more previously set rules.

BRIEF DESCRIPTION OF THE DRAWINGS

These and other features and advantages of the various embodiments disclosed herein will become better understood with regard to the following description, appended claims, and accompanying drawings wherein:

DETAILED DESCRIPTION

Figure 1:
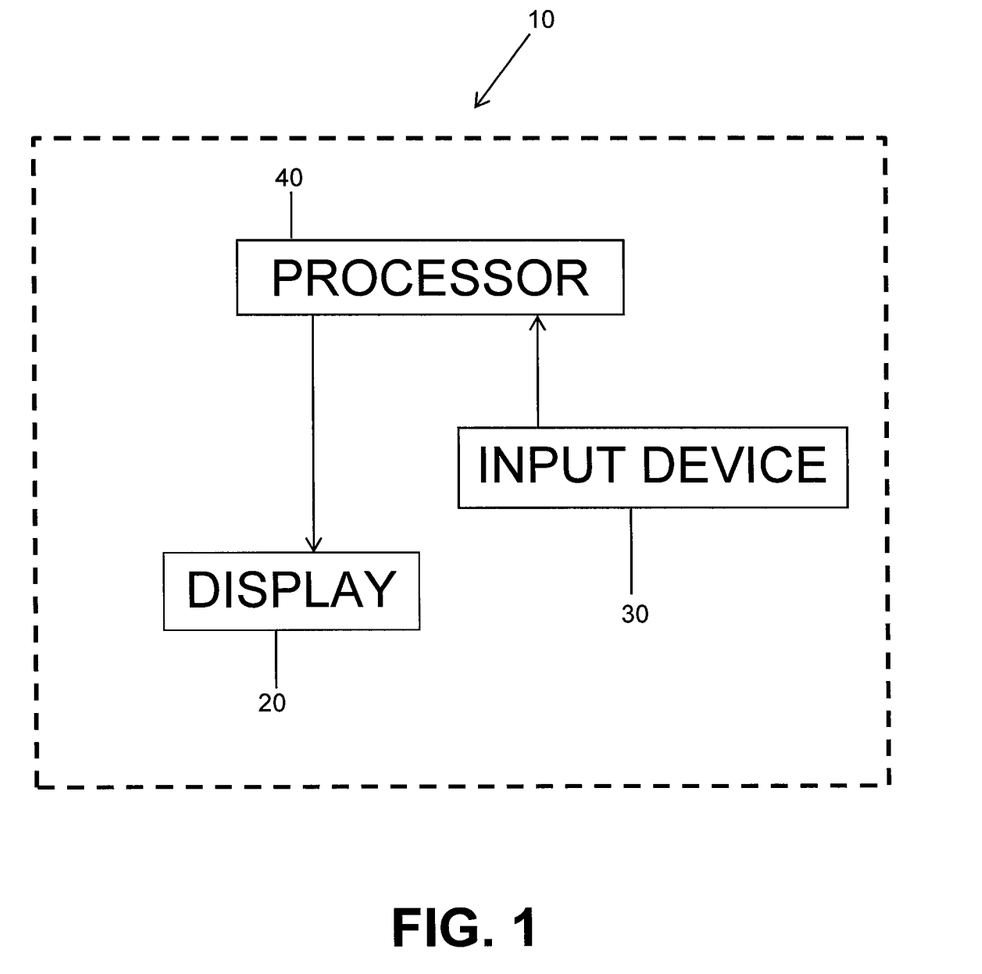
FIG. 1 is a block diagram of an input unit that is capable of executing a shoulder-surfing resistant authentication method in accordance with the concepts of the various embodiments disclosed herein.
Figure 2:
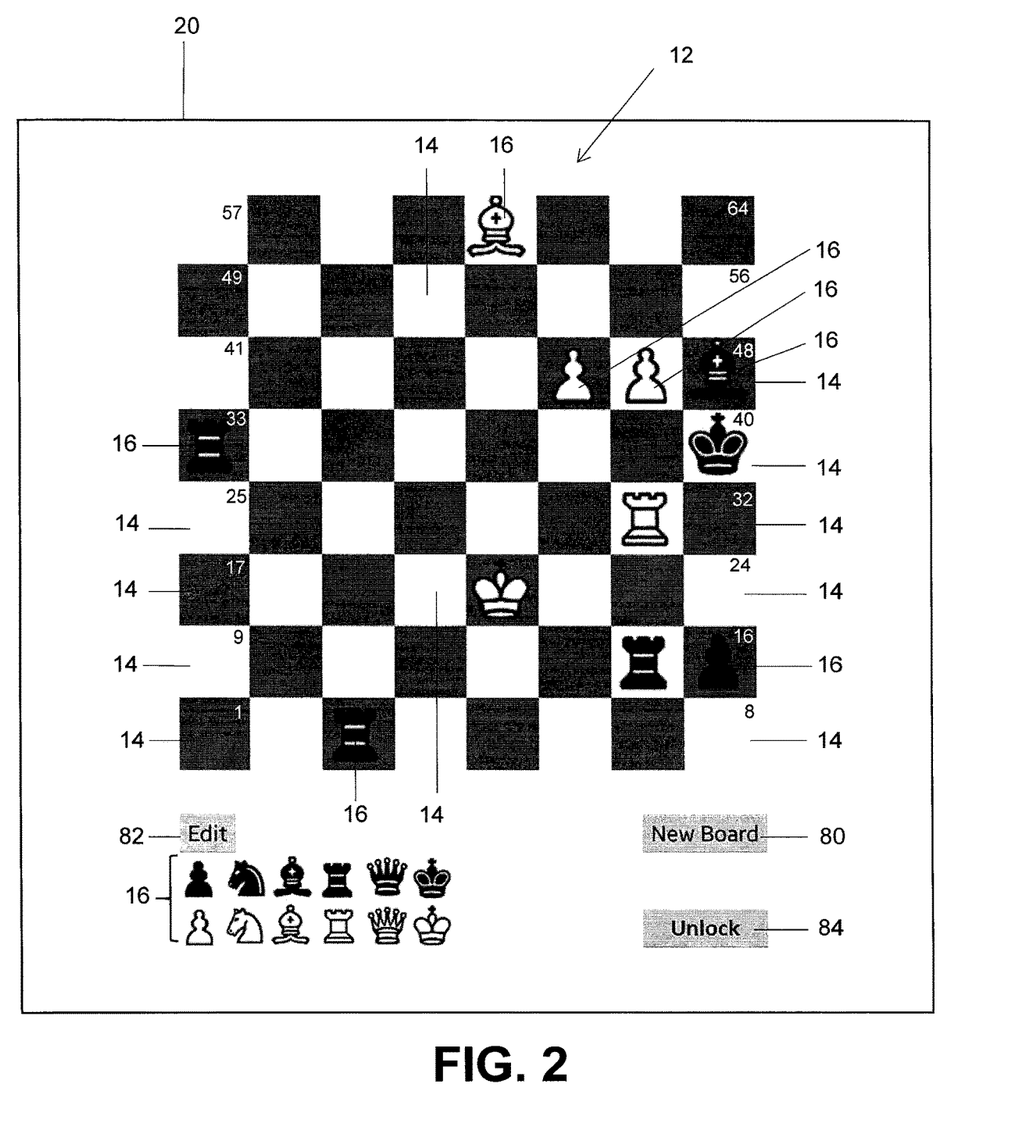
FIG. 2 is a perspective view of a virtual environment utilized the by shoulder-surfing resistant authentication method in accordance with the concepts of the various embodiments disclosed herein.

A shoulder-surfing resistant authentication method is presented herein and may be executed on any suitable input unit 10, as shown in FIG. 1, such as a smartphone. To carry out the authentication method, a virtual environment 12, which in some embodiments is a game playing environment, is visually presented on a display 20 of the input unit 10, as shown in FIG. 2. The virtual environment 12 includes a plurality of discrete locations 14, which allow one or more icons 16 to be moved therebetween using an input device 30, such as a touch screen. In addition to moving the icons 16, they can also be modified, removed or added relative to the environment 12. A user's passcode is defined or "set" by selecting one or more predetermined rules that identify how the icons 16 are required to be controlled by the user relative to the environment 12. Accordingly, during each attempted authentication process, a user is initially presented with a random environment that includes any number of icons that are randomly arranged relative to the locations 14. Finally, if the user enters his or her passcode by controlling the icons 16, such as by moving, modifying, removing, or adding them in a manner that satisfies or matches the rules defining their previously "set" or stored passcode, the "entered" passcode is authenticated.

It should be appreciated that the input unit 10 may comprise any portable or fixed computing system, and may include smart phones, tablet computers, portable or stand-alone computers, specialized computer systems, such as an ATM (automated teller machine), point-of-sale (POS) payment systems, distributed computer systems, as well as combinations thereof, and the like. Thus, the input unit 10 may comprise any device or system that provides the display 20, the input device 30, and a suitable processor that is capable of performing the authentication method discussed herein. Thus, the authentication method disclosed herein is used to provide secure access to the input unit 10 itself, or used to secure access to any application or content being executed or presented by the input unit 10. However, in other embodiments, the input unit 10, or the necessary portions thereof, may be configured to be retrofit with existing devices or systems that would benefit from the additional level of authentication security that is provided by the method disclosed herein. For example, a bank safe may be retrofit with the input unit 10, so that access to the contents within the safe is restricted to only those individuals that can be authenticated using the disclosed method. Moreover, it should be appreciated that the authentication method may be utilized in any context where controlled or secure access, to any digital or physical content, item, area, device, system, data, application or the like, is to be limited to only an authorized person or party who has an authenticatable passcode.

The display 20 of the input unit 10 may comprise any suitable display that is capable of presenting the virtual environment 12 in 2 or 3 dimensions. For example, the display 20 may utilize any display technology, such as liquid crystal display (LCD) technology for example. In some embodiments, the display 20 may comprise a touch screen, which also serves as the input device 30. In other embodiments, the display 20 may be a projector capable of projecting images onto a surface or into space, such as in the case of a hologram. In further embodiments, the display 20 may be configured as a virtual reality 3D display (i.e. stereoscopic display), which is able to present virtual reality (VR) 3D images. In still further embodiments, the display 20 may be a two-dimensional (2D) display, whereby the virtual environment 12 is rendered by using suitable image shading and/or perspective techniques, or any suitable 3D depth cue, to give the appearance to the user that the virtual environment 12 is in three-dimensions.

The input device 30 may include any suitable device that allows the user to control the icons 16 relative to the virtual environment 12 that is presented on the display 20. For example, the input device 30 may include, but is not limited to: a touch screen interface, a keyboard, a direction pointer device, a stylus, a directional control pad, as well as combinations thereof and the like. In other embodiments, voice commands may be used to control movements of the icons 16. Furthermore, in other embodiments, motion tracking sensors or cameras, may act as the input device 30. For example, the motion tracking sensors or cameras may interpret the movement of one or more parts of the user's body, such as hands, arms, eyes, as well as facial expressions, gestures or the movement another object or item attached to or held by the user as control signals for controlling the icons 16. It should be appreciated that the icons 16 may be presented on the display 20 so that the user has a first-person or a third-person perspective of the icons 16. Thus, in some embodiments, third-person icons 16 may be replaced with a first-person icon 16. In further embodiments, a first-person perspective of a selected icon 16 may be utilized without displaying the icon 16 that is under control, such that only the environment 12 with relation to the user is shown on the display 20.

The display 20 and the input device 30 are in operable communication with a processor 40, which may include any suitable computing device that includes the necessary hardware, software or combination thereof to execute the authentication method disclosed herein. It should also be appreciated that the processor 40 may comprise a general purpose or application specific computing unit. In some embodiments, the processor 20 may comprise a distributed computing system or a remotely located computing unit, such as a cloud-based computing unit. Thus, in some embodiments, the processor 20 may be remotely located from the display 20 and the input device 30.

Thus, the display 20, input device 30 and processor 40 of the input unit 10 communicate together in order carry out the shoulder-surfing resistant authentication method to be discussed in detail below, using any suitable wired or wireless communication protocol, or combination thereof. It should be appreciated that while the display 20, the input device 30 and the processor 40 of the input unit 10 may be provided in a single unit, they may be discretely or separately arranged so that one or more of the display 20, input device 30 and processor 40 are remotely located from the others. For example, the display 20 on which the virtual environment 12 is presented, and the input device 30 that is used to control the movement and actions of the icons 16 may be remotely located from the processor 40. In some embodiments, the input unit 10 may be configured to include the display 20 and the input device 30, which are configured to be interfaced or retrofit with an existing processor that is part of or maintained by another device or system. For example, the display 20 and the input device 30 may be retrofit or interfaced with a processor, such as by a wired or wireless input/output interface, of an existing POS or ATM system.

In order to enter a passcode using the shoulder-surfing resistant authentication method, the virtual environment 12 and icons 16 are presented on the display 20, whereupon the icons 16 are controlled by the input device 30 to move between various locations 14 that are arranged in the virtual environment 12 in a particular layout. In particular, the virtual environment 12 may comprise any computer generated 2 or 3 dimensional area, space, or map, or combinations thereof, where the layout or arrangement of the various locations 14 may be presented in any desired manner. In addition, the virtual environment 12 may be embodied as any fictitious or real-life environment for example. Furthermore, the environment 12 may be embodied as any desired building, room, area, terrain or location. For example, the environment 12 may embody a virtual map of a theme park, with each location 14 being associated with a particular attraction or ride within the theme park to which icons 16 may be moved or otherwise controlled in the manner discussed herein.

The layout of the various locations 14 in the environment 12 may be presented in any desired manners. For example, the locations 14 may be oriented in 2 or 3 dimensions, and may be spaced apart, adjacent, at different heights, in different areas, as well as any combination thereof and the like. In addition, the layout of the locations 14 may be randomly arranged or in a predetermined pattern, such as two-dimensional grid, as shown in FIG. 2. Furthermore, the locations 14 may be of any desired number and shape. In some embodiments, the environment 12 may include one or more reference identifiers, which may be any item, object, character, or any other identifying mark or representation placed in the environment 12 to serve as a landmark to assist the user in the movement or other control of the icons 16 during the authentication process. For example, the reference identifiers may comprise the character "X", as well as trees, cars, televisions, and desks. In some embodiments, the locations 14 that the icons 16 are permitted to occupy or be moved to are placed throughout the environment 12 and are visually identified, such as by different colored blocks, as shown in FIG. 2. However, in other embodiments, the locations 14 may not be visually identified to the user. In other embodiments, the locations 14 may be associated with an area or region that is proximate or near to the various reference identifiers in the environment 12, such as a tree or table for example. Thus, in some embodiments, the area defining the location 14 that is proximate to the reference identifiers may or may not be shown to the user. In still further embodiments, the icons 16 may be controlled to freely move about the environment 12 when navigating to or between different locations 14, or alternatively, the icons 16 may be controlled so that they move discretely, from one location 14 to another without traversing across or through the environment 12. In some embodiments, one or more icons 16 may be moved to a desired location 14 by moving sequentially or randomly between various locations 14.

In some embodiments, the virtual environment 12 may comprise a 2 or 3 dimensional game, or game environment, such as a 2 or 3 dimensional virtual game board, whereby the layout of the various locations 14 corresponds to the particular game that is being implemented by the authentication method. The game embodied by the virtual environment 12 may replicate any desired game, such as known games, including, but not limited to: Monopoly®, Scrabble®, Life®, Pokémon Go!® chess, checkers and the like. For example, the game discussed with regard to FIG. 2 relates, in some embodiments, to that of the game of chess. Alternatively, the game that is utilized may be configured as a made-up or contrived game, which is not known to the user prior to their using the authentication method.

In addition, in some embodiments, the rules associated with how to play the game that is embodied by the environment 12 may or may not need to be adhered to when a user controls the icons 16 to enter their passcode during the authentication process.

Furthermore, in other embodiments, a different environment or a different layout of locations 14 in the environment 14, may be presented by the display 20 during different authentication attempts of an "entered" passcode by the user. For example, a different game may be used, or a different game layout that is associated with the same game, but having locations 14 that are arranged in a different way may be used. In some cases, the different environment and location layouts may be randomly generated. In addition, the different environment or different layout may be utilized by the authentication process after a predetermined time or usage interval. In some embodiments, a different environment 12 or layout of locations 14 may be utilized by the authentication method each time the user seeks to "enter" their passcode during the authentication process. Thus, when a randomly generated environment 12 is presented to the user, a passcode may be set so that its defining rules are independent of the environment or layout embodied by the environment 12 that is presented on the display 20. That is, the rules of the set passcode may be configured so that the passcode is can be satisfied by the user during the authentication process regardless of the particular environment (e.g. game environment) or layout (e.g. game layout) that is used. This provides an additional level of prevention against shoulder-surfing attacks. In further embodiments, the user may request that a new environment or layout be displayed at any time by selecting a "New Board" option 80 presented by the display 20 using the input device 30.

With regard to the icons 16, they may comprise game pieces particular to the game being used, as well as any graphical or alphanumeric character, symbol, or other virtual placeholder that can be controlled by the input device 30. For example, in the embodiment discussed herein, with regard to FIG. 2, the icons 16 embody chess game pieces. In some embodiments, a user may control the icons 16 to move, add, or remove icons 16 relative to the environment 12. That is, the user may move one or more of the icons 16, in any direction or to any location 14 in the environment 12. However, in some embodiments, where the specific "game rules" associated with the game that is embodied by the environment 12 are applied, the user must control the one or more icons 16 so that they comply with such "game rules", otherwise a user's control of the one or more icons 16 will not be permitted. In other embodiments, the control or adjustment of the icons 16 via the input device 30 may also allow a change or modification of various visual or physical characteristics of the icons 16, including but not limited to: color, size, orientation, or appearance, as well as combinations thereof, and the like.

Thus, during the authentication process, a user utilizes the input device 30 to control one or more of the icons 16, so as to perform one or more: moving of one or more of the icons 16 to different locations 14, modifying the visual or physical characteristics of one or more of the icons 16, removing one or more of the icons 16 from the environment 12, or adding one or more of the icons to the environment 12, in any combination or sequence. However, it should be appreciated that the movements of the icons 16 may also include any desired action, including, but not limited to walking, jumping, scrolling, flying and the like. Furthermore, additional icons 16 may be added to the environment 12 and subsequently controlled by the user via the input device 30, as previously discussed. Thus, the interaction of the icons 16 relative to the environment 12, such as by any combination of moving, modifying, adding or removing of the icons 16, creates an "entered" passcode that seeks to satisfy the one or more rules that define a previously "set" or stored passcode, which are to be discussed in detail below. It should be appreciated that in some embodiments that the movement, modification, removal and addition of the icons 16 may be initiated by selecting an "Edit" option 82 presented on the display 20 using the input device 30.

It should be appreciated that any combination of one or more of rules may be used to form a "set" passcode. That is, the rules of the "set" passcode define the manner in which the icons 16 are to be controlled, such as by moving, modifying, removing, and adding, or any combination thereof in order for an "entered" passcode to be authenticated. Exemplary rules 1-12, which may be used individually or in any combination to define a "set" passcode in connection with the environment 12, having the layout of locations 14 shown in FIG. 2, are presented below:

1. Number of Locations Moved in Total:

This rule defines the number of locations 14 in the environment 12 that are required to be moved. Thus, to satisfy this rule, a user must move one or more of the icons 16 so that the number of locations 14 that are moved or traversed by the icons 16 in total is equal to a predetermined number (n). For example, in some embodiments, the environment 12 may be embodied as a plurality of locations 14 that are arranged as a grid or array, which are numbered from #1 to #64, where the bottom left corner is #1, and the top right is #64, as shown in FIG. 2. Moving one of the icons 16 to the right or to the left by "one" location 14 adds or decreases the number of locations moved in total by "one" respectively. Similarly, moving an icon 16 directly up or down by one row adds or decreases the number of locations 14 moved in total by 8 respectively. Adding a new icon 16 to a particular location 14 in the environment 12 adds to the total number of locations 14 moved by an amount that is equal to the particular location number (#) associated with that location 14. For example, if a user sets the number of required icon moves to n=8 during the passcode "setting" process, the user can ultimately satisfy this rule by adding an icon 16 to location #8 if the location 14 is not occupied. Alternatively, this same rule can be satisfied by moving an icon 16 that is at location #12 to location #20 if the destination location is not occupied by another icon 16. In addition, removing an icon 16 from a location 14 decreases the total number of locations moved in total by "one".

To further mitigate shoulder-surfing attacks, the authentication method, in some embodiments, utilizes multiple icon 16 movements together to achieve the total number of location 14 movements. For example, if the passcode rule requires that the number of moves is set to n=8, a user can move an icon 16 forward by 20 locations, move another icon 16 backward by 10 locations, add a new icon 16 to location #28, and remove an icon 16 from location #30 to make the number of locations moved to be a total of 8. Thus, given the layout used by the environment 12 of FIG. 2, the range of n is [−2080,2080] as $\Sigma_{i=1}^{64}$ i=2080.

Thus, the manner in which moves of the icons 16 are interpreted to add or subtract from the total number of moves may be implemented in a variety of manners. For example, moving the icon 16 in some subset of permitted directions relative to the environment 12 may be considered as an additive move, which adds to the total number of moves, while moving the icon 16 in another subset of the permitted directions relative to the environment 12 may be considered as a subtractive move, which subtracts from the total number of moves. Furthermore, jumps between or over disparate or separated locations 14 by the icon 16 may also be used to represent the number of total locations 14 that have been jumped, which may be added or subtracted from the total number of icon 16 moves made.

2. Number of Icons in a Row:

This rule defines the color, row index, and the number of icons 16 (i.e. icon parameters) that must exist in a specific row before the rule is satisfied. For example, to satisfy this rule, a user must move the icons 16 so that the specific row has the required number of icons 16 in it that are also of the required color. This can be achieved by adding icons 16 or removing icons 16 from the row, as a randomly generated row may have more icons 16 than are needed. The number of possible combinations of rule parameters for this rule is 3×8×8=192, as icon color can be black, white, or both, and the environment 12 of FIG. 2, has 8 rows and 8 columns.

3. Number of Icons in a Column:

This rule is similar to that identified in rule 2 above, but is applied to a column of the environment 12. That is, this rule defines the color, column index, and the number of icons 16 (i.e. icon parameters) of a particular color that must exist in a specific column before the rule is satisfied. Thus, the number of possible combinations for the icon parameters for this rule is 192.

4. Number of Icons in the Environment:

This rule is similar to rule 2 above, but is applied to the entire number of locations 14 provided by the environment 12. That is, this rule defines the color and the number of icons 16 (i.e. icon parameters) that must exist in the environment 12 before the rule is satisfied. The icon parameters of this rule are color and number of icons 16 in the environment 12, so the number of possible combinations of the parameters is 3×64=192, as icon color can be black, white, or both, and the environment 12 can include up to 64 icons 16 in total.

5. More or Less Icons:

This rule defines the particular color and number of icons 16 that must be added and/or removed from the environment 12 before the rule is satisfied. That is, in order to satisfy this rule, a user must add or remove the specified number of icons 16 of the specified color. In other embodiments, to further mitigate shoulder-surfing attacks, a user may add and remove the icons 16 multiple times. And so long as the final number of icons 16 added or removed from the environment 12 totals the specified number, the rule is satisfied. The number of possible combinations of the parameters for this rule is 3×64×2=384 because icon color can be black, white, or both, and at most 64 icons 16 can be added or removed from the environment 12.

6. Specific Location:

This rule defines the particular icon 16 type and color (i.e. icon parameters) that must be at a location 14 that is positioned at a particular row index and a column index before this rule is satisfied. The number of possible combinations of the parameters for this rule is 6×3×8×8=1152 as the icon type can be king, queen, bishop, knight, rook, or pawn; the icon color can be black, white, or both colors; and the environment 12 has 8 rows and 8 columns.

One or more of the following rules may be used in conjunction with one or more of the rules 1-6, discussed above, but are based on rules of the game of chess. Furthermore, the environment 12, shown in FIG. 2 is capable, due to its layout of locations 14, of supporting such chess game play. Accordingly, the chess-based rules identified as rules 7-12, are presented as follows:

7. Number of Attacks on an Icon:

This rule is satisfied when an icon 16 of the required type (i.e. king, queen, bishop, knight, rook, or pawn) and color (i.e. white or black) is attacked by a specified number of attacker icons. For example, such rule may require that a bishop icon 16 of either white or black color is under attack by five other icons. Thus, if there is no such icon initially in the environment 12 when the environment 12 was generated, a user can add it. If there are multiple such pieces initially on the environment 12, then only one of them is required to be under attack by the specified number of attacking icons 16. The number of possible combinations of the icon parameters is 6×3×16=288 as the icon type can be king, queen, bishop, knight, rook, or pawn; the icon color can be black, white, or both colors; and the maximum number of attacks to one location 14 is 16 (4 diagonal attacks, 2 horizontal attacks, 2 vertical attacks, and 8 attacks by knights). Note that not every location 14 can have 16 attackers (e.g. corner locations 14 can have a maximum of 5 attacker icons), so it may be necessary to move an icon 16 or to place a new icon 16 in order to satisfy larger numbers of attacks.

8. Number of Attacks by Icon:

This rule is satisfied when a particular icon 16 of a selected type and color is attacking a chosen number of other icons 16 of a particular icon type. For a king, a queen, or a knight, there are 3×8=24 combinations because icon color can be black, white, or both and a king, a queen, or a knight can attack a maximum of 8 icons. For a bishop or a rook, there are 3×4=12 combinations because a bishop or a rook can attack 4 pieces at most. For a pawn, there are only 3×2=6 combinations because a pawn can only attack two pieces at most. So the total number of possible combinations is 3×24+2×12+6=102.

9. Number of Icons Under Attack:

This rule is satisfied when the selected number of icons of a specified color are under attack. Since the maximum number of attacks is 64 when the environment 12 is filled, and every icon is under attack, and icon color can be black, white, or both, the number of possible combinations is 3×64=192.

10. More or Less Attacks on an Icon:

This rule is satisfied when the particular number of attacks are added or removed from an icon 16 of the specified type and color. Additionally, if there is no such icon initially provided then a user can add it. As described in rule 7, the maximum number of attacks on one location is 16. Since icon color can be black, white, or both and 2 the piece type can be king, queen, bishop, knight, rook, or pawn, the number of possible combinations is 3×6×32=576.

11. More or Less Attacks by an Icon:

This rule is satisfied when the particular number of attacks are added or removed from an icon 16 of the particular color and type. A king, queen, or knight can attack 8 pieces at most. In other words, a user can select any of the 16 possible values between −8 and 8. The number of possible combinations for a king, queen, or knight is 3×16=48 since color can be black, white, or both. A bishop or rook can attack a maximum of 4 pieces, so the number of possible combinations for a bishop or a rook is 3×8=24. A pawn can attack up to 2 icons, so the number of possible combinations for a pawn is 3×4=12. The total number of combinations is 204.

12. More or Less Icons Under Attack:

This rule is satisfied when a user adds or removes the selected number of attacks to icons 14 having a particular color. A user can add or remove up to 64 attacks. The number of possible combinations of the parameters is 3×128=384 since icon color can be black, white, or both.

Thus, while the rules 1-12 above are discussed above with regard to the exemplary environment 12 shown in FIG. 2, such rules may be readily adapted for use with any environment. Furthermore, one or more of the specific rules associated with a particular game embodied by the environment 12 may be utilized to form a "set" passcode. For example, one or more of the rules associated with the game Monopoly® may be used to define a "set" passcode.

Figure 3:
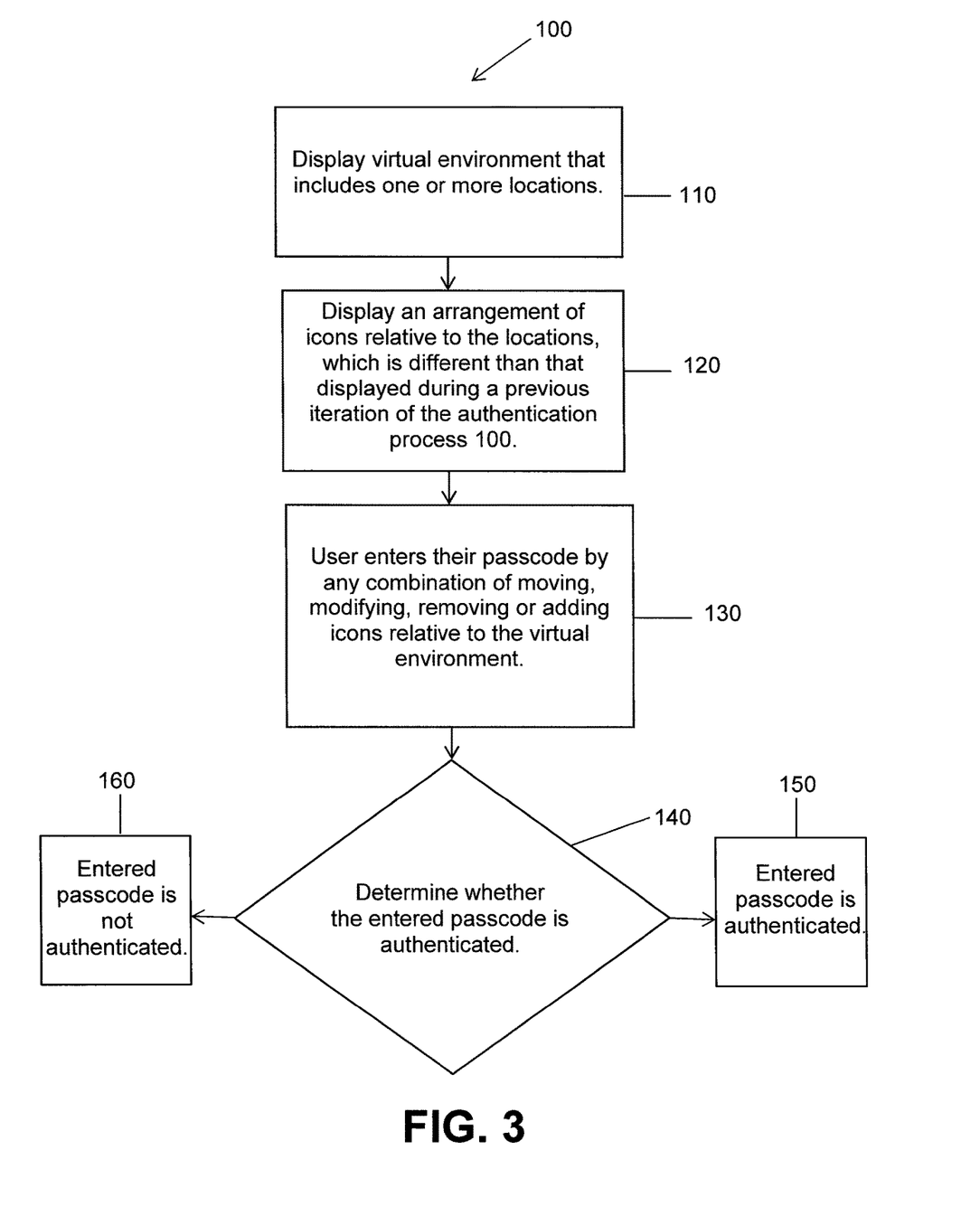
FIG. 3 is a flow diagram of the shoulder-surfing resistant authentication method in accordance with the concepts of the various embodiments disclosed herein.

With the details of the input unit 10 and the rules 1-12 discussed above, the operational steps taken to carry out the shoulder-surfing resistant authentication method, referred to by numeral 100, are shown in FIG. 3. Initially, at step 110, the display 20 presents the user with the environment 12 that includes one or more locations 14 having a predetermined or randomly generated layout. For example, as previously discussed, the environment 12 and layout of the locations 14 may be associated with a game, such as chess. It should be appreciated that in some embodiments, after a predetermined number of iterations of the authentication method 100, such as after each iteration, or after a random number of iterations of the authentication method 100, the environment 12 and/or layout of the locations 14 used by the current iteration of the process 100 is changed or modified, so as to be different from that utilized in the previous(s) iteration of the process 100.

Next, at step 120, one or more icons 16 are arranged in the environment 12, and are each associated with a respective corresponding location 14. In particular, the initial presentation of the icons 16 is made in accordance with an initial icon profile, or initial profile, that defines various attributes of icons 16. For example, the initial profile discussed with regard to the exemplary process 100, defines the particular number of icons 16 to be displayed and the particular arrangement or pattern of the icons 16 that is to be used. However, it should also be appreciated that in addition to that discussed, the initial profile may also define how other aspects of the icons 16 are to be presented. For example, the initial profile may define the appearance of the icons 16, including size and color, that is to be initially presented in the environment 12. Furthermore, one or more of the attributes of the initial profile, is changed, or made different, each time the authentication process 100 is performed. For example, an initial profile defining the number and/or arrangement of the icons 16 utilized by the current iteration of step 120 of the authentication process 100 differs from that utilized in the iteration of the process 100 that was performed immediately before the current iteration of the process 100. However, in some embodiments, the initial profile (e.g. number and/or arrangement of the icons 16) may be changed after a predetermined or random number of iterations of the authentication process 100 have been performed. In addition, the initial profile (e.g. number and/or arrangement of the icons 16) that is used may be predetermined or generated randomly by the process 100, although in other embodiments, the initial profile (e.g. number and/or arrangement of the icons 16) may be generated using an algorithm or a look-up table having stored profiles each identifying the particular values or characteristics the attributes of the initial profile are to take on (e.g. the particular number and the particular arrangement of the icons 16 that are to be presented). In addition, in the case of initial profiles that are predetermined, they may be selected for use on a predetermined basis, such as a sequential basis, on a random basis, or a combination thereof.

At step 130, the user controls the one or more initially presented icons 16, by any one or combination of moving, modifying, removing or adding icons 16 relative to the environment 12 in a manner to satisfy the rules of their previously "set" passcode. In some embodiments, the user may control one or more of the icons 16 in any manner they desire, without being restricted to performing only the particular control of the icons 16 that directly contribute to the satisfaction of the rules of the "set" passcode. That is, the movement of the icons 16 may be controlled to perform additional icon 16 movements, as well as any additional modifications, additions, or removal of icons 16 that are not required to be performed by the rules of the "set" passcode. Such movements that are unrelated to the direct satisfaction of the "set" passcode may be deemed as "fake" moves, which have the additional benefit of further confusing any unauthorized individual attempting to perform a "shoulder-surfing" attack on the user during the authentication process.

Continuing, at step 140, the "entered" passcode is compared against the "set" passcode established at step 130 to determine if the control of one or more of the icons satisfied the rules of the "set" passcode. It should be appreciated that in some embodiments, step 130 may be initiated by selecting an "Unlock" option 84 provided by the environment 12 using the input device 30. If the user's control of the icons 16 satisfies each of the one or more rules that define their "set" passcode, the user is authenticated, as indicated at step 150. Alternatively, if the user's control of the icons 16 does not satisfy each of the one or more rules that define their "set" passcode, the user is not authenticated, as indicated at step 160.

Thus, the authentication method 100 is configured to automatically change or modify the attributes or characteristics of the initial profile (e.g. number of icons, arrangement of the icons 16, and visual characteristics of the icons 16, etc.) of the icons 16 that appear in the environment 12, such as after each iteration of the authentication process 100. Such a capability effectively confuses a shoulder-surfer, who has successfully captured an authorized passcode, as they are presented with an entirely different number and/or arrangement of icons 16 when they seek to apply the stolen passcode during a subsequent iteration of the authentication process 100. That is, due to the new or different arrangement of the icons 16 presented in the subsequent iteration of the authentication process 100, the shoulder-surfer's frame of reference for controlling the icons 16 is entirely altered from that associated with the stolen passcode. As a result, the shoulder-surfer is not be able to control the new arrangement of icons 16 in the same verbatim or literal manner as defined in the stolen passcode to achieve successful authentication. Thus, the shoulder-surfing resistant method 100 disclosed herein is advantageous in that it provides increased passcode space, improved security strength, as well as improved memorability.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. An authentication method comprising:
displaying a randomly generated virtual environment;
providing one or more icons arranged relative to the virtual environment, wherein a location of each of the one or more icons is randomly arranged relative to the virtual environment;
updating at least one attribute of said one or more icons relative to the virtual environment to form an entered passcode; and
determining whether the entered passcode is authenticated based on a comparison with a previously set rule, wherein the previously set rule is independent of the randomly generated virtual environment.

2. The authentication method of claim 1, wherein said display step is performed by a display selected from a group consisting of: a two-dimensional (2D) display, a three-dimensional (3D) display, or a virtual reality (VR) display.

3. The authentication of method of claim 2, wherein said display is a touch screen display.

4. The authentication method of claim 1, wherein said updating step is performed by one or more of removing: at least one of said one or more icons, adding one or more new icons, moving at least one of said one or more icons, or changing at least one visual characteristic of said one or more icons.

5. The authentication method of claim 4, wherein said updating step is performed by controlling said one or more icons by an input device.

6. The authentication method of claim 5, wherein said input device is selected from the group consisting of: a touch screen interface, a keyboard, a direction pointer device, a stylus, a directional control pad, a camera, a motion tracking device, or a voice recognition device.

7. The authentication method of claim 1, wherein said one or more icons are presented as a first-person image or a third-person image.

8. The authentication method of claim 1, wherein said virtual environment includes a plurality of discrete locations in a predetermined arrangement, and said attribute of said one or more icons is a position at one of said discrete locations.

9. The authentication method of claim 8, wherein said environment includes one or more reference identifiers positioned relative to one or more of said plurality of discrete locations.

10. The authentication method of claim 8, wherein said updating step comprises moving at least one of said one or more icons to one or more of said discrete locations.

11. The authentication method of claim 10, wherein said rule comprises a predetermined sequence of moves of said one or more icons to one or more said discrete locations.

12. The authentication method of claim 8, wherein said predetermined locations are visually identifiable on said display.

13. The authentication method of claim 1, wherein said rule is a sequence of updates to one or more of said icons.

14. The authentication method of claim 1, wherein said rule comprises moving at least one of said one or more icons a predetermined number of times.

15. The authentication method of claim 14, further comprising:
changing said previously set rule.

16. The authentication method of claim 15, wherein said rule further comprises moving said at least one of said one or more icons to specific said locations.

17. The authentication method of claim 1, further comprising:
changing said virtual environment after each determining step is performed.

18. The authentication method of claim 1, wherein said updating step includes updating a plurality of said attributes, such that at least one of said attributes being updated is excluded from said entered passcode.

19. The authentication method of claim 1, wherein the previously set rule can authenticate a multitude of uniquely entered passcodes.

\* \* \* \* \*